T. DARBY.
Hog-Traps.
No. 141,633. Patented August 12, 1873.
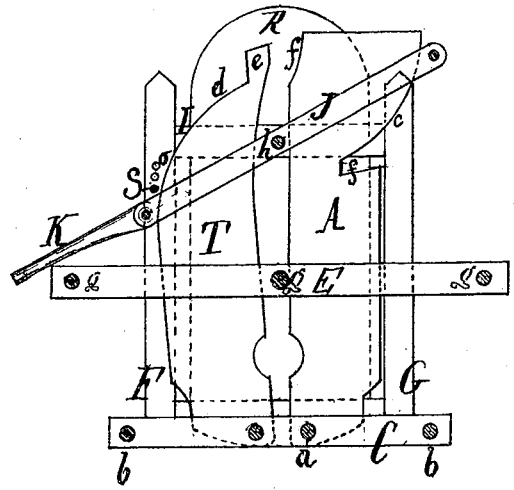
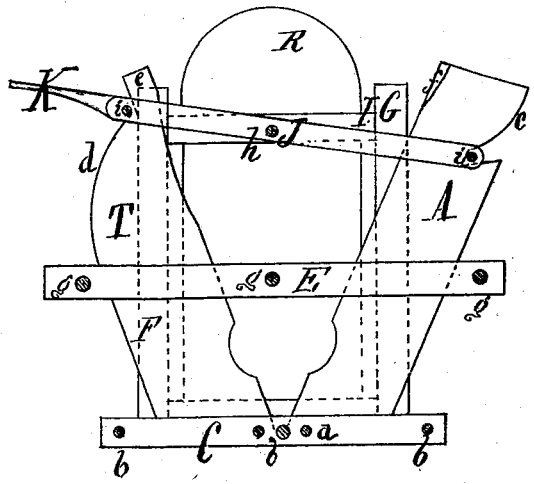
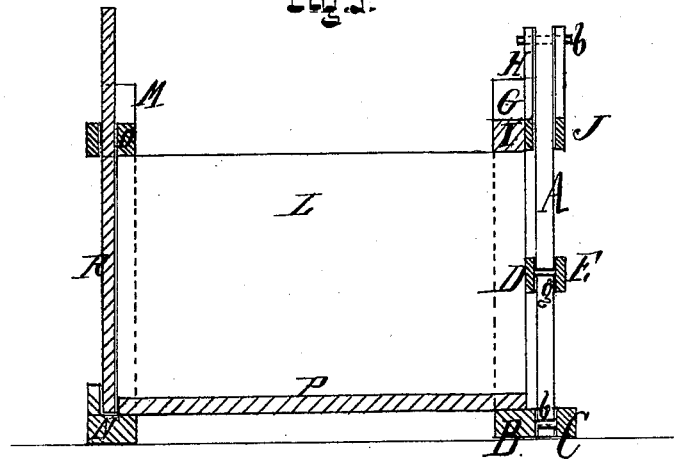
Witnesses:
Richard Genner
Franklin Barritt
Inventor:
Thomas Darby
Per Henry Genner
Atty.

UNITED STATES PATENT OFFICE.

THOMAS DARBY, OF DUNCAN, ILLINOIS.

IMPROVEMENT IN HOG-TRAPS.

Specification forming part of Letters Patent No. 141,633, dated August 12, 1873; application filed May 23, 1873.

*To all whom it may concern:*

Be it known that I, THOMAS DARBY, of Duncan, county of Stark, State of Illinois, have invented certain Improvements in Hog-Traps, of which the following is a specification:

The object of my invention is to provide a cheap, simple, and efficient trap for hogs. My invention consists in constructing and placing two cam-shaped or inclined boards at one end of a hog-pen in such a manner that they can be opened and closed together at will, and instantaneously, by simply elevating or depressing a lever. Said boards are pivoted near one edge to the side and in the center of the pen by aid of pins, which pass through a guide-piece fastened to the bottom timber of the pen. Another guide for the boards, which are placed in a vertical direction, is fastened to the sides in the center, between the top and bottom of the pen. The outside top end of one of the pivoted boards is cut in the form of the upper part of a quarter of a circle, to the top of which a short upright or check is added. The outside top end of the other board is cut in the form of the lower part of a quarter of a circle. A lever, to which a side guide is connected by three pins, is pivoted in the center of the top-side timber of the pen. By depressing or elevating a handle connected to this lever the boards are closed or opened, as may be required. By virtue of their own gravity, being pivoted at one side, they are separated when the lever is elevated. The lever, to which the guide-pins are attached, causes these to travel over the quarter-circles or inclined planes of the boards, and brings them together when the lever is depressed.

The parts of the boards against which the hogs rub in passing the trap may be rounded or slightly cut out to facilitate the passing of the animals.

In order to more fully describe my invention, I refer to the accompanying drawing forming a part of this specification.

Figure I represents a front view of a hog-pen embodying my invention, showing the hog-trap shut. Fig. II is the same view, showing the hog-trap open. Fig. III is a sectional view of the same.

A is the board to the right of the front side of the pen, to which the trap is attached, being pivoted, by aid of a pin, $a$, to the bottom timber B and guide-board C, which is fastened at both ends and in the center, by aid of pins $b\ b\ b$, to the bottom timber B. The top of the board A is cut in the form of the lower part of a quarter-circle, $c$. T is the other board, to the left of the front side of the pen, placed in the same position as the board A, from which it only differs in the top being cut in the form of the upper part of a quarter-circle, $d$. A projection or check, $e$, is formed on the top of the board T. In the top of the board A is made an incision, $f$, to receive the projection $e$ when the trap is closed. D and E are two guide-boards fastened to the side timbers F and G, and held together by aid of pins $g\ g\ g$. H is a lever pivoted at $h$ to the top timber I, $h$ and $i\ i$ being pins holding the guide-board J to the lever H. K is the handle to the lever H. S is a pin inserted in the holes $o\ o$ in the side timbers F, serving to hold the lever-handle K down when the trap is closed. L L are the side boards; M M, side timbers; N, bottom timber; and O, the top timber. P are the bottom boards, and R a sliding door at the back of the pen.

Having thus described my invention, I desire to claim—

The cam-shaped or inclined boards A and T, lever H, and guide-boards C, D, and E, in combination with the timbers B, F, G, and I, substantially as and for the purpose hereinbefore set forth.

THOMAS DARBY.

Witnesses:
GEO. COLWELL,
JOS. P. PAUL.